United States Patent [19]

Barry

[11] Patent Number: 5,507,855

[45] Date of Patent: Apr. 16, 1996

[54] PROCESS AND INSTALLATION FOR SUPPLYING NITROGEN WITH THE AID OF SEMI-PERMEABLE MEMBRANES USING A VARIABLE MEMBRANE GEOMETRY

[75] Inventor: Lionel Barry, Versailles, France

[73] Assignee: L'Air Liquide Societe Anonyme Pour L'Etude et L'Exploitation des Procedes Georges Claude, Paris, France

[21] Appl. No.: 348,982

[22] Filed: Nov. 28, 1994

[30] Foreign Application Priority Data

Nov. 26, 1993 [FR] France .................. 93 14174

[51] Int. Cl.⁶ ............... B01D 53/22; B01D 71/62
[52] U.S. Cl. ............ 95/12; 95/22; 95/23; 95/45; 95/54; 96/7; 96/13
[58] Field of Search ............... 95/8, 12, 19, 22, 95/23, 45, 54; 96/4, 7–9, 13

[56] References Cited

U.S. PATENT DOCUMENTS

| | | | |
|---|---|---|---|
| 4,397,661 | 8/1983 | King et al. | 55/158 |
| 4,421,529 | 12/1983 | Revak et al. | 95/54 |
| 4,537,606 | 8/1985 | Itoh et al. | 96/7 |
| 4,553,988 | 11/1985 | Shimizu et al. | 96/7 |
| 4,789,388 | 12/1988 | Nishibata et al. | 96/7 |
| 4,806,132 | 2/1989 | Campbell | 95/54 X |
| 4,859,331 | 8/1989 | Sachtler et al. | 96/8 X |
| 4,881,953 | 11/1989 | Prasad et al. | 95/54 X |
| 5,013,331 | 5/1991 | Edwards et al. | 95/54 X |
| 5,053,058 | 10/1991 | Mitariten | 95/8 |
| 5,158,584 | 10/1992 | Tamura | 95/54 X |
| 5,178,650 | 1/1993 | Hayes | 95/54 X |
| 5,249,428 | 5/1993 | Barbe et al. | 62/78 |
| 5,266,101 | 11/1993 | Barbe et al. | 95/23 |
| 5,281,253 | 1/1994 | Thompson | 95/54 X |
| 5,284,506 | 2/1994 | Barbe | 95/23 |
| 5,290,341 | 3/1994 | Barbe | 95/54 |
| 5,302,189 | 4/1994 | Barbe et al. | 95/22 X |
| 5,388,413 | 2/1995 | Major et al. | 95/54 X |

FOREIGN PATENT DOCUMENTS

| | | |
|---|---|---|
| 0054941 | 6/1982 | European Pat. Off. . |
| 0359149 | 3/1990 | European Pat. Off. . |
| 0409545 | 1/1991 | European Pat. Off. . |
| 0520863 | 12/1992 | European Pat. Off. . |
| 59-130519 | 7/1984 | Japan ........................ 96/4 |
| 60-011206 | 1/1985 | Japan ........................ 96/4 |
| 63-001419 | 1/1988 | Japan ........................ 96/8 |
| 63-123421 | 5/1988 | Japan ........................ 96/7 |
| 63-123422 | 5/1988 | Japan ........................ 96/4 |

Primary Examiner—Robert Spitzer
Attorney, Agent, or Firm—Burns, Doane, Swecker & Mathis

[57] ABSTRACT

A process for supplying a flow of nitrogen to a site having flowrate requirements varying between a nominal flowrate and a range situated thereabove comprising: a) passing compressed air into a main line in a separating assembly formed by at least two membrane separation lines mounted in parallel, wherein at least one of the separation lines can be shut off from the main line, the separating assembly having one of the following configurations: a1) when the flowrate requirements are situated at a level of the nominal flowrate, all of the membrane separators of the assembly are in operation, none of the separating lines being shut off; a2) when the flowrate requirements of the site exceed a predetermined flowrate, at least one of the lines of the separating assembly is shut off, keeping at least one separation line and its membrane separator in operation; b) advancing nitrogen gas obtained at the outlet side of each of the membrane separators to a collector connected downstream of the main line; c) evacuating gas obtained at the permeate side of each of the membrane separators in operation in stage 2), enriched with oxygen; and d) directing nitrogen gas delivered by the collector towards at least one user station via a control device for controlling flowrate delivered by the collector, increasing or reducing this flowrate if necessary.

16 Claims, 4 Drawing Sheets

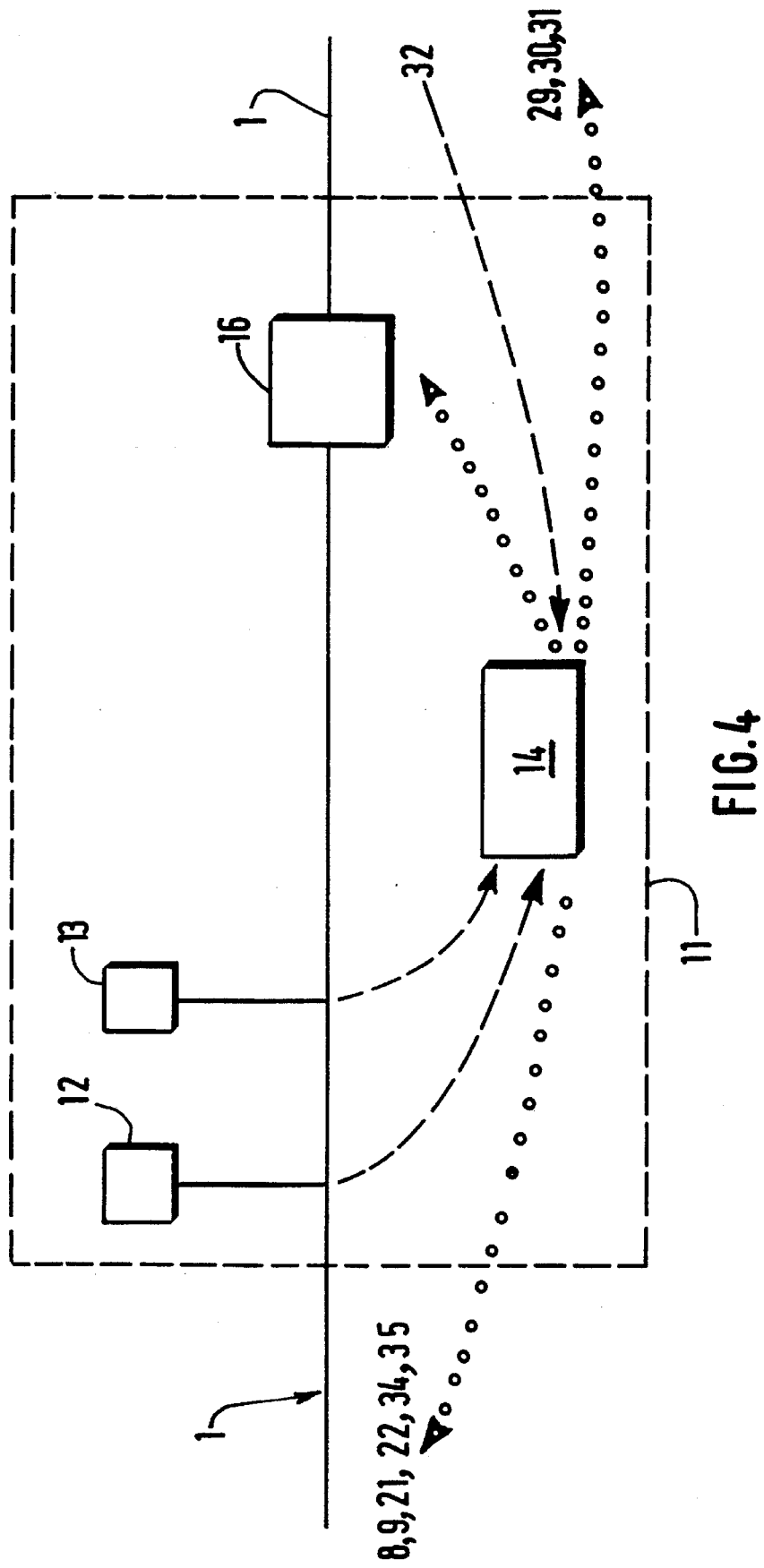

PROCESS AND INSTALLATION FOR SUPPLYING NITROGEN WITH THE AID OF SEMI-PERMEABLE MEMBRANES USING A VARIABLE MEMBRANE GEOMETRY

BACKGROUND OF THE INVENTION (i) Field of the Invention

This invention relates to the supply of nitrogen of variable purity with the aid of membrane separation. The invention applies more particularly to cases where it is necessary to supply a user whose nitrogen flowrate requirements can vary over a relatively wide flowrate range.

(ii) Description of Related Art

The production of nitrogen by means such as membranes (the term "membrane module" is also often used) or preferential adsorption modules, often referred to in both cases as in situ or "on-site" means, has developed considerably in recent years all over the world, complementing conventional production by cryogenic means, as these means have the following advantages:

excellent reliability of the supply;

low production costs, and the possibility of supplying, at very attractive costs and in accordance with the applications in question, nitrogens of adjusted purity, sometimes referred to as "impure nitrogens", insofar as the residual oxygen concentration of these nitrogens can vary from several thousands of ppm (parts per million) to several %.

In the particular case of semi-permeable membranes, the principle is that, as a result of the effect of a partial pressure difference on either side of the membrane, a mixture obtained at low pressure enriched with the most permeable components is obtained at the permeate side. A mixture at a pressure close to the supply pressure (of the ingoing mixture) and enriched with the least permeable components is obtained at the membrane outlet (also referred to as the "retentate" side or "discharge" side).

Therefore, semi-permeable membranes having good properties for separating nitrogen with respect to oxygen (selectivity), e.g. of the polyimide or polyaramide type, are used to produce "impure" nitrogen from air, the mixture enriched with oxygen being obtained at the permeate side.

It will therefore be clear that the performances obtained will depend very largely on the conditions of use of the membrane, such as temperature, supply pressure of the membrane, or the content in the supply mixture of the component it is desired to separate at the permeate side.

With respect to temperature, it is known that at a high temperature (e.g. 80° C.), the productivity of the membrane increases, but the $O_2/N_2$ selectivity of the membrane deteriorates. In this context, it is often necessary to work under conditions in which the temperature parameter is adjusted.

in order to produce nitrogen of reduced purity (e.g. 5% residual oxygen), compressed air brought to a relatively high temperature (e.g. 60° C.) can be used, and in order to produce nitrogen of high purity (e.g. 1000 ppm residual oxygen), compressed air brought to a relatively low temperature, often close to ambient temperature or lower, can be used.

Still in the case of membranes, a certain number of disadvantages have nevertheless been noted connected to the relatively inflexible nature of this "on-site" production means, particularly with respect to the nitrogen flowrates required and actually used by the user. It is therefore particularly difficult from the outset to design an installation for the "on-site" production of nitrogen at the outset for a user whose flowrate requirements can vary around a nominal value considered average by that user, wherein the flowrate range over which the flowrate can vary is relatively extensive.

Similarly, it is also particularly difficult from the outset to design an installation for the "on-site" production of nitrogen for a user whose flowrate requirements are necessarily going to vary in the course time as a result of changes in production associated with advances or setbacks depending on the circumstances (e.g. leading to the purchase of new furnaces operating with nitrogen).

In order to respond to this difficulty, the solutions existing at present propose, e.g. providing a buffer tank at the user site at a given point when the nitrogen requirements are reduced or increased. This method can only reasonably accommodate moderate variations in consumption, and of short duration.

Another solution consists in providing a reserve of liquid nitrogen produced by cryogenic means for increases in consumption, this solution of course having the disadvantage of its additional cost.

Other more complicated solutions generally assume a modification of the source of processed air, this having negative effects with respect to capital investment or the response time of the equipment when the user station has to move rapidly from a nominal flowrate to an increased or reduced flowrate.

U.S. Pat. No. 4,806,132 can therefore be cited by way of example, relating to the case where the membrane (particularly in the case of nitrogen production) must be able if necessary to produce a lower flowrate than the nominal cruising flowrate used, wherein the initial purity of the nitrogen must be maintained or can undergo a certain deterioration.

The document cites the example of an "on-site" nitrogen consumption which could be decreased by 30% relative to a nominal flowrate. The solution proposed by this document is to modify the air source by reducing the flowrate of the compressor and the pressure of the air supplied, by adjusting parameters, such as the opening of valves downstream of the compressor or of the drive variables of this compressor. This method of operation therefore necessitates a modification of the air source, this constituting a significant complication and having consequences from the point of view of instrumentation and therefore capital investment.

The European patent EP-A-517 570 can also be cited by way of example, the aim of which is to be able to adapt to an increasing or reduced consumption, if necessary also with a variation from the point of view of the nitrogen purity required. The solution proposed if overconsumption occurs on site over a wide flowrate range consists in increasing the flowrate of processed air (e.g. by increasing the number of compressors or by having overdesigned the compressor) and in parallel by increasing the permeability of the membrane by playing on the temperature. This solution therefore has disadvantages from the point of view of capital investment, an increase in instrumentation and an increase in the response time of the equipment (particularly to temperature).

Finally, U.S. Pat. No. 4,397,661 can also be cited by way of example, this document envisaging a different case as it describes the processing and separation of a gaseous mixture with the aid of an assembly of membranes in which, in contrast to the preceding cases, it is the flowrate of the ingoing mixture that can be varied, as is the case with the separation of hydrogen from an $H_2/N_2/CH_4/Ar$ mixture produced by any installation such as that of a refinery. In addition, the element it is desired to separate in this case is obtained at the permeate side of the membrane. The solution proposed in this document assumes the use of a variable membrane surface area. The higher the flowrate to be processed, the higher the number of membranes used (in parallel), while endeavouring to keep the concentration of the permeable element at the permeate side of the membranes constant.

The permeate of each of the membranes is thus connected to a common recovery line.

SUMMARY OF THE INVENTION

In this context, the aim of this invention is to propose an improved process for supplying nitrogen of variable purity with the aid of membrane separation so that increases in consumption (and thus increases in the required nitrogen flowrate), including those in large proportions relative to a nominal flowrate, can be accommodated without having to modify the air source in any way and in cases where variations in purity are admissible.

To this end, the process according to the invention includes the following stages:

a) compressed air is passed via the upstream part of a main line in a separating assembly formed by at least two membrane separation lines mounted in parallel, each line including a membrane separator, and wherein at least one of the separating lines can be shut off from the main line by shut-off means, adopting one of the following configurations as the case may be:

a1) when the flowrate requirements of the site are situated at the level of the nominal flowrate, all of the membrane separators of the assembly are in operation, none of the separating lines being shut off;

a2) when the flowrate requirements of the site exceed a predetermined flowrate, at least one of the lines of the separating assembly is shut off, keeping at least one separating line and its membrane separator in operation;

b) the gas obtained at the outlet side of each of the membrane separators in operation in stage a) is advanced to a collector itself connected downstream to a downstream part of the main line;

c) the gas obtained at the permeate side of each of the membrane separators in operation in stage a), enriched with oxygen, is evacuated towards the external atmosphere or advanced to a user station requiring the use of a gas of this kind enriched with oxygen, and d) the gas originating from the collector is directed along the downstream part of the main line towards at least one user station via a device for controlling the flowrate delivered by the collector, increasing or reducing this flowrate if necessary.

BRIEF DESCRIPTION OF THE DRAWINGS

FIG. 4 is a diagrammatic view showing details of the flowrate control device of FIG. 3.

DETAILED DESCRIPTION OF THE PREFERRED EMBODIMENTS

Figure 1:
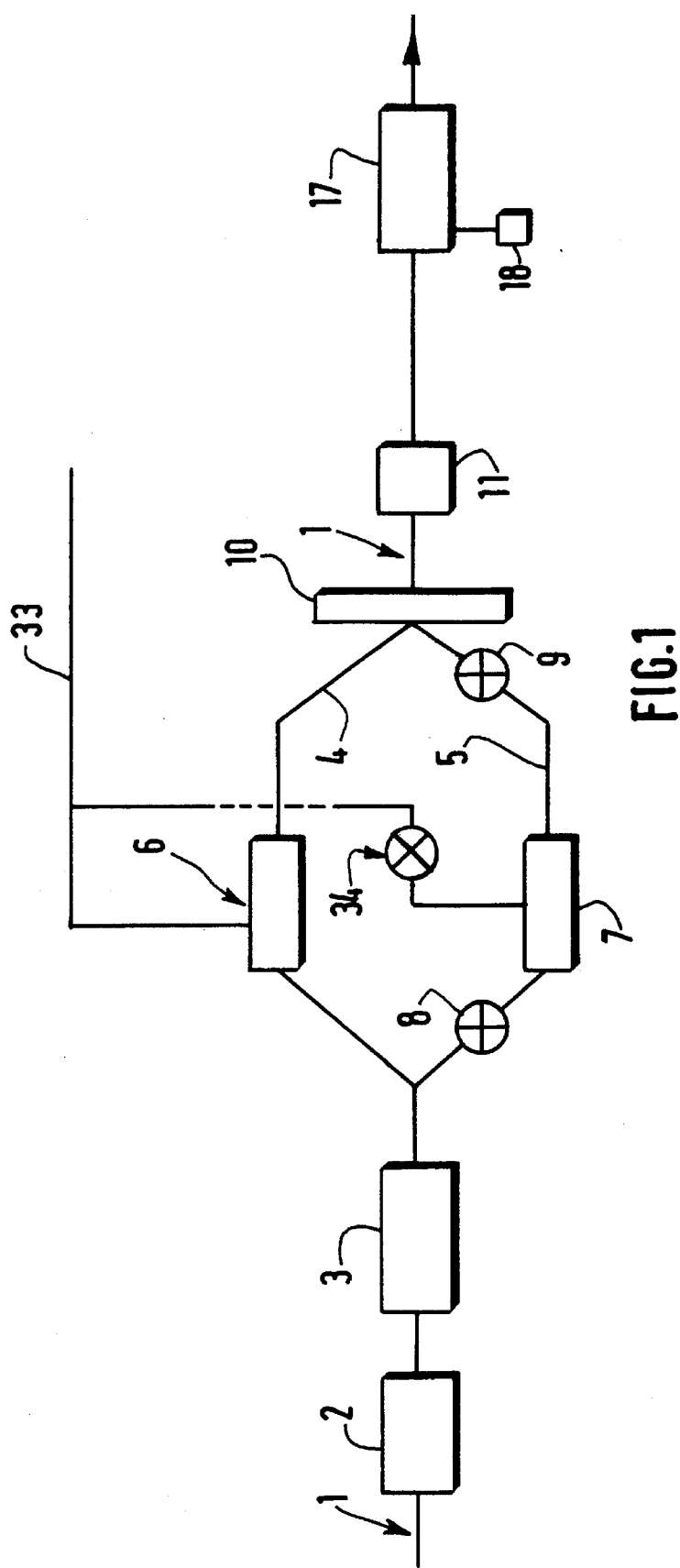
FIG. 1 is a diagrammatic view of an installation suitable for carrying out the process according to the invention and for supplying nitrogen to a site, the consumption of which is situated alternately at a nominal flowrate or at peak consumption.

The process according to the invention therefore leads in a surprising manner to an increase in the production gas flowrate, with the aid of a reduction in the membrane active surface.

According to one of the features of the invention, when the flowrate requirements of the site fall back below the predetermined flowrate of stage a2), a phase a3) is initiated in which the line or lines shut off in stage a2) are brought back into operation.

The phrase "membrane separator" as used according to the invention refers to an assembly of one or more semi-permeable membranes (or membrane modules) mounted in series or in parallel having good properties for separating oxygen with respect to nitrogen (selectivity) as is the case, e.g. for membranes of the polyimide or polyaramide type.

The phrase "shut-off means" as used according to the invention refers to any means ensuring that the air to be processed cannot pass into the line it is desired to shut off (or "close"), wherein this means can be present, e.g. at the inlet of the line, but also at the outlet of the line (in front of its connection point with the main downstream line) in order to prevent any gas from going up the line. It would also be possible to envisage the presence of one shut-off means at the line inlet and another shut-off means at the permeate outlet of the membrane separator in question, or the combination of a shut-off means at the line outlet and another shut-off means at the permeate outlet of the membrane separator in question.

According to the invention, e.g. manual mechanical means, such as quarter-turn valves, or remote release automatic means, such as solenoid valves, can be envisaged as shut-off means.

The operations for shutting off a separating line or for bringing a separating line back into operation taking place in the case of a2) or a3) of stage a) will be triggered, if necessary, by a signal which can be emitted manually, such as by a push button (e.g. situated at the user station), or automatically, such as that obtained by a safety device at a low pressure level, wherein the pressure level can be evaluated on the main line or if necessary in a buffer tank. The lines can also be shut off manually in a very simple manner without a trigger signal by the simple will and intervention of an operator. Taking the example of a pressure safety device, the user site increasing its consumption at a given moment will reduce the pressure on the main line, thereby triggering the operation for shutting off the line(s) described hereinabove below a certain pressure level to be defined in each case.

The expression "collector" as used according to the invention refers equally to a simple connection point on the main line at which the downstream parts of all of the separating lines of the separating assembly are connected, and to a suitable device situated on the main line downstream of the separating assembly defining a volume for recovering the gas originating from each of the lines of the separating assembly in operation.

The phrase "flowrate control device" as used according to the invention refers to a means for at least modifying this flowrate if necessary, in order to increase or reduce it if phases of the type a2) or a3) prevail. It would therefore be possible to use any of the means for varying a flowrate, either manual or automatic means (e.g.: limiter, manual control valve or mass flow controller, etc.). If necessary, this flowrate, once modified, can be regulated, i.e. kept permanently at a predetermined value. The "flowrate control device" according to the invention will thus moreover comprise regulating means, such as a control box acting on a mass flow controller, or a programmable controller, etc.

According to one of the features of the invention, the flowrate delivered by the collector and/or the residual oxygen concentration in the gas delivered by the collector and/or the pressure of the gas originating from the collector are measured during stage d) and the flowrate is regulated using one of the measurements as an input variable.

According to one of the embodiments of the invention, the flowrate is regulated as follows: the downstream part of the main line downstream of the control device of stage d) is subdivided into at least two secondary lines, wherein each of these lines can be shut off separately and is provided with a flowrate regulator (either, e.g. of the mechanical type or of the automatic type, such as, e.g. a mass flow controller) compatible with a predetermined flowrate range, the downstream part of each of these regulators being connected once again to the main line and, depending on whether a1), a2) or a3) prevails, the gas originating from the control device is passed via the secondary line, the flowrate regulator which has an admissible flowrate range compatible with the value of the flowrate it is desired to regulate, or in some cases via several of these lines.

According to one of the features of the invention, the separating assembly uses membranes of different types and/or performance, so that, for these membrane separators, it is possible to take advantage of the membranes originating from one single membrane production lot or from different lots, but having variable performance as a result of a normal manufacturing standard deviation.

The criteria taken into account can therefore be the productivity of the membrane (i.e. the nitrogen flowrate obtained under given conditions of temperature, pressure, membrane surface area and purity of the nitrogen produced), or the yield of the membrane (i.e. the ratio of the nitrogen flowrate produced to the flowrate of processed air under given conditions of temperature, pressure, membrane surface area and purity of the nitrogen produced).

According to one of the embodiments of the invention, in the case of a2) of stage a), the membrane separator or separators shut off are selected from the least efficient of the membrane separators of the separating assembly.

The nitrogen produced at the outlet of the collector typically has a residual oxygen concentration situated within the range [0.1%, 10%].

As will be clear to the person skilled in the art, the range of flowrates over which the consumption of the site will vary situated between a nominal flowrate and an upper limit representing the peak consumption of the site, will of course vary from one site to another and therefore will have to be defined for each individual case. The same thing applies to the flowrate to be predetermined which triggers (at a2)) the shutting-off of one or more separating lines, wherein this "predetermined flowrate" within the context of the invention can be the nominal flowrate itself, but also a flowrate situated within the nominal to peak consumption flowrate range.

As will be clear to the person skilled in the art, by virtue of the process according to the invention, it is in fact possible in a very flexible manner to deal with intermediate situations between the nominal flowrate and the upper limit flowrate, closing the separating lines even "one by one" and then opening them "one by one" again if necessary.

If a buffer tank is present at the end of the line, it will be possible to take the flowrate levels (nominal, peak, etc.) into account, but also in an equivalent manner the pressures in the buffer tank: a drop in pressure in the tank below a certain pressure level which can be connected to an increase in the flowrate above a certain flowrate level triggering the closure of at least one of the separating lines. The buffer tank can moreover be used in a conventional manner in order to stop the production system when consumption falls at a given point below the nominal flowrate and to operate with the reserve stored in the buffer tank, or, during nominal operation, to stop the system (which operates with all of the separators for nominal operation) in a regular manner in order to operate on the basis of the reserve stored in the buffer tank, then to fill it again by starting up the system again (all lines in operation) etc.

It would also be possible to envisage circumstances in which account will be taken of the derivatives (speed variations) of the flowrate or pressure, or, particular cases where the change in configuration will take place at a fixed time each day (e.g. in order to effect a complete purge every two hours or to effect systematic high-capacity purging of the installation when it is started up again).

The invention also relates to an installation for supplying nitrogen suitable, inter alia, for carrying out the process according to the invention, comprising along a main line, between an air compressor and at least one user station:

a separating assembly formed by at least two membrane separation lines mounted in parallel, each line including a membrane separator, at least one of the separating lines including means for shutting it off and each membrane separator being provided with a line for the evacuation of its permeate towards the exterior and with a line for the evacuation of its outlet;

a collector situated between the separating assembly and a downstream part of the main line, to which collector all of the lines for the evacuation of the outlet from the membrane separators of the separating assembly are connected, and a device for controlling the flowrate delivered by the collector, situated between the collector and the user station or stations at the end of the line.

According to one of the features of the invention, the installation according to the invention comprises at least one air-conditioning station interposed between the air compressor and the membrane separation assembly, allowing for operations, such as de-oiling, filtering, drying or possibly bringing the air to the correct temperature.

According to one feature of the invention, the downstream part of the main line comprises a buffer tank downstream of the device for controlling the flowrate.

According to one feature of the invention, the installation comprises in addition a means for triggering the shutting-off or reopening of one or more of the lines of the separating assembly. This means can be, e.g. manual, such as a push button, or automatic, such as that obtained by a safety device at a low pressure level.

According to one of the features of the invention, the downstream part of the main line is subdivided downstream of the device for controlling the flowrate into at least two secondary lines, wherein each of these lines can be shut off separately and is provided with a flowrate regulator (either of the mechanical or of the automatic type, e.g. of the mass flow controller type) compatible with a predetermined flowrate range, the downstream part of each of these regulators being connected once again to the main line upstream of the user station.

According to the invention, the separating assembly can use membranes of different types and/or performance if necessary.

According to one of the embodiments of the invention, at least one of the membrane separators of the separating assembly is formed by membranes of the polyimide or polyaramide type.

Other features and advantages of this invention will be clear from the following description of embodiments given purely by way of non-limiting examples and with reference to the accompanying drawings, in which:

FIG. 1 shows, along a main line 1, an air compressor 2 typically a lubricated screw-type compressor, providing compressed air at, e.g. $13 \times 10^5$ Pa absolute, an air-conditioning station 3 typically comprising a drier (of the centrifugal separator type), a de-oiler (including, e.g. a carbon tower), a particle filter and a heater, e.g. an electric heater, bringing the compressed air to a temperature higher than ambient temperature, e.g. to 45°.

At the outlet of the air-conditioning station, the air conditioned in this manner arrives at a separating assembly which, in the embodiment shown, comprises two separating lines 4 and 5 in parallel. Each of these lines comprises a membrane separator (6 and 7 respectively).

The line 5 moreover comprises at its inlet and at its outlet a shut-off valve of the "all or nothing" type (8 and 9).

The membrane separator 6 of the line 4 consists, e.g. of 4 membrane modules of the hollow fibre type, the active layer of which is a polyimide, mounted in parallel, and the properties of which allow a total exchange surface area of approximately 130 $m^2$ to be obtained per module. The modules offering the best separating yield were selected for this line. The membrane separator 7 of the line 5 therefore consists of 2 membrane modules mounted in parallel of the same type and with the same exchange surface area as the separator 6.

It will be noted that, in each case, the separator is mounted with a throttle valve at the separator outlet (not shown) for accommodating the differences in the individual performances of the membranes of the assembly when the two lines are in operation simultaneously.

A collector 10 is disposed at the outlet of the separating assembly, the downstream part of the lines 4 and 5 (and therefore the outlet from the membrane separators 6 and 7) ending in this collector, the downstream part of the collector 10 being connected to a device 11 for controlling the flowrate delivered by this collector.

It will be noted that the permeate side of each of the separators 6, 7 of the separating assembly is evacuated via a line 33 towards the exterior of the installation or towards a user station at the site requiring the use of a gas enriched with oxygen.

The presence of a shut-off valve 34 situated at the permeate side of the separator 7 will moreover be noted.

Figure 2:
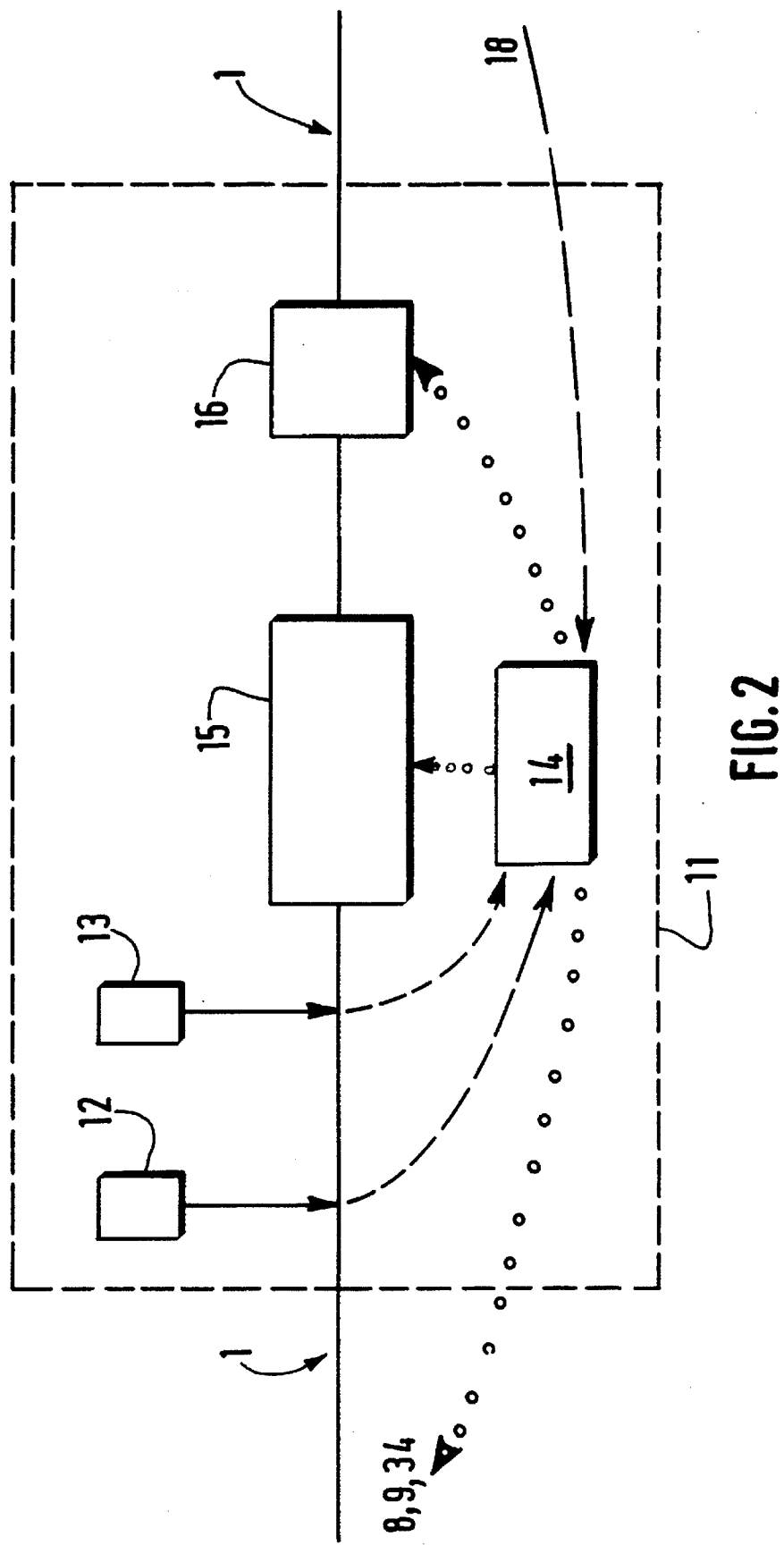
FIG. 2 is a diagrammatic view showing details of the flowrate control device of FIG. 1.

FIG. 2 shows details of the elements forming the device 11 of FIG. 1, which comprises a flow meter 12 (e.g. of the Vortex type), an oxygen analyser 13 and a programmable controller 14 acting inter alia on a regulating valve 15 and an "all or nothing" valve 16 downstream of the valve 15.

FIG. 1 shows a buffer tank 17 provided with a pressure sensor 18, this buffer tank being located downstream of the device 11.

The user station or stations downstream of the buffer tank have not been shown in FIG. 1.

The programmable controller 14 can itself perform all of the following functions:

receiving information about the flowrate (12) and about the oxygen concentration (13) (arrows consisting of discontinuous dashes);

receiving information about a drop (or rise) in pressure at the buffer tank 17 (via the sensor 18) (arrows consisting of discontinuous dashes), and acting on the valves 8 and 9 (or 8 and 34 or 9 and 34) in order to shut off (or reopen) the line 5 and acting on the regulating valve 15 in order to open it further or close it if necessary, taking account of the flowrate parameter or of the oxygen concentration parameter for the purposes of this regulation (arrows consisting of discontinuous dots).

Figure 3:
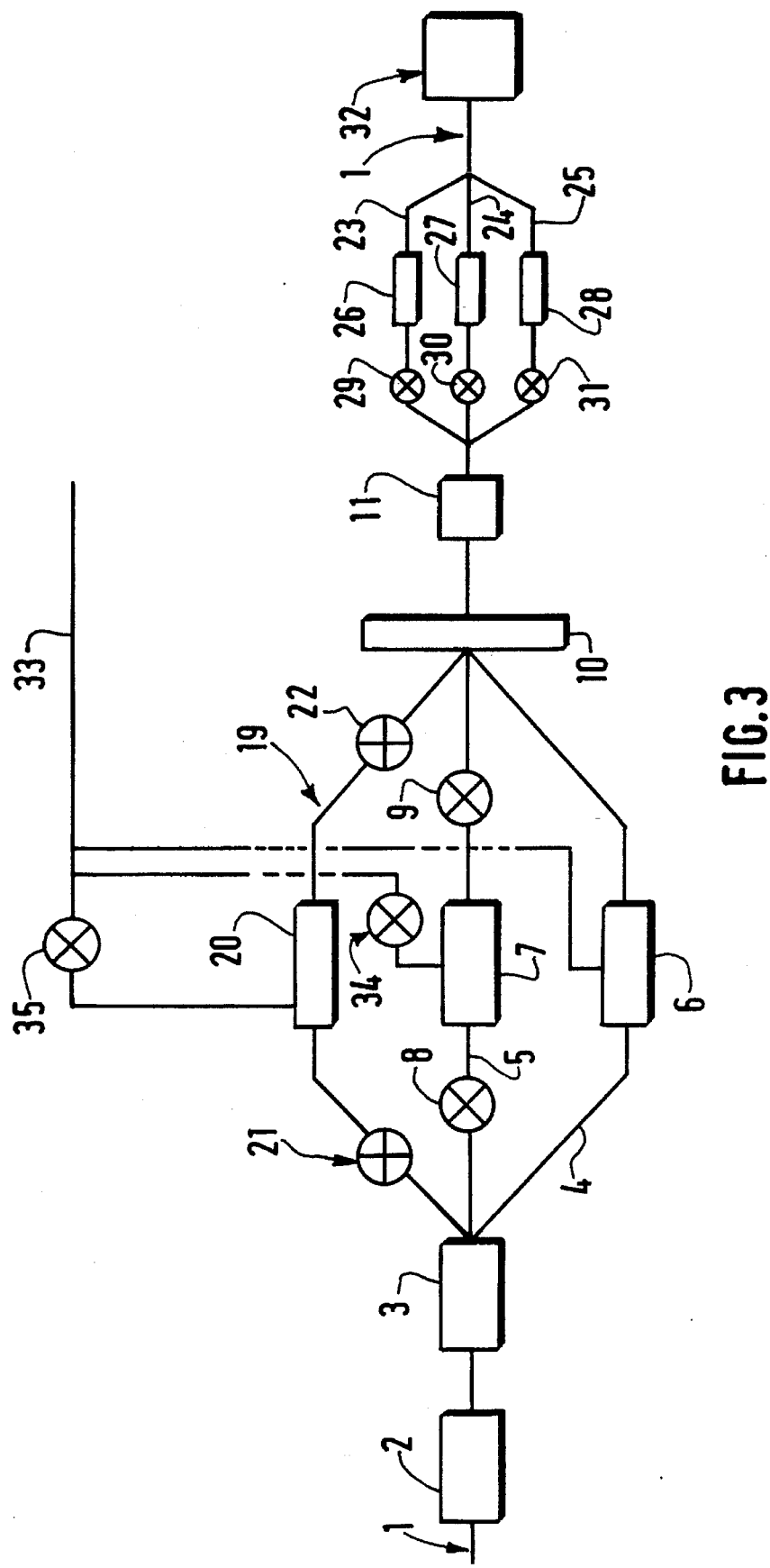
FIG. 3 is a diagrammatic view of another installation suitable for carrying out the process according to the invention and for supplying nitrogen to a site, the consumption of which is situated equally at a nominal level, at a peak consumption level or at an intermediate level between two points.

FIG. 3 shows an installation in which it is necessary to provide an intermediate flowrate between the nominal flowrate and peak consumption. In addition to the elements 2 (compressor), 3 (conditioning station) and 10 (collector) of the same type as those described in association with FIG. 1, and the first two separating lines 4 and 5, this figure shows a third separating line 19 including a membrane separator 20 which can be shut off by "all or nothing" valves 21 and 22 disposed on either side of the separator 20, the three lines opening downstream into the collector 10. At the outlet of the flowrate control device 11 (the details of which will be given hereinafter in association with FIG. 4), the production gas meets a network of three lines in parallel 23, 24, 25, wherein each line is provided in the case of the embodiment shown with a mechanical flowrate regulator 26, 27, 28 and can be shut off upstream by a valve 29, 30, 31, wherein the ducts downstream of this network rejoin the downstream part of the main line 1 towards a user station 32, and may or may not pass through a buffer tank 17 (not shown in FIG. 3). This user station is provided with manual push buttons (not shown) allowing the user to pass manually from "nominal flowrate" operation to "peak consumption" operation, if necessary passing through "intermediate flowrate" operation.

The membrane separator 20 will be designed (type of membrane, number of membranes and exchange surface area) as a function of the position of the intermediate flowrate to be delivered in the interval [nominal flowrate-peak consumption].

It will be noted here once again that the permeate side of each of the separators 6, 7, 20 of the separating assembly is evacuated via a line 33 towards the exterior of the installation or towards a user station at the site requiring the use of a gas enriched with oxygen, and that shut-off valves 34 and 35 respectively are disposed at the permeate outlets of the separators 7 and 20 and can also be used to shut off the lines.

FIG. 4 shows details of the design of the device 11 in this case. In this case it moreover includes the flow meter 12, the oxygen analyser 13 and the all or nothing valve 16, a programmable controller 14 in this case performing all of the following functions:

receiving information about the flowrate (12) and about the oxygen concentration (13)(arrows consisting of discontinuous dashes);

receiving information about a signal originating from the station 32 (push button) or information about a drop (or rise) in pressure at the buffer tank 17 (via the sensor 18) (arrows consisting of discontinuous dashes);

acting on the valves 8, 9, 21, 22, 34, 35 in order to shut off (or reopen) one of the lines 5, 19 depending on whether there is a move from the nominal flowrate (all lines in operation) to the intermediate flowrate (one line closed) to peak consumption (a second line closed) (arrows consisting of discontinuous dots), and acting on the shut-off valves 29, 30, 31 of the branch lines 23, 24, 25 so as to pass the gas flow originating from the collector through the flowrate regulator, the range of which corresponds to the flowrate it is desired to regulate, for each flowrate described hereinabove, taking account, e.g. of the flowrate parameter (12) or of the oxygen concentration parameter (13) for the purposes of this regulation (arrows consisting of discontinuous dots).

The absence of the regulating valve 15 will be noted in FIG. 4 as the network of secondary lines 23, 24, 25 regulates the flowrate in this case.

In one embodiment, an installation such as the one described in association with FIG. 1 has been used to supply a user station under the following conditions (the residual oxygen concentration is regulated in this case):

for cruising operation of the user station (nominal flowrate), the installation operates with the two membrane separators at the same time. As soon as the pressure in the buffer tank reaches $10^6$ Pa, the compressor is stopped and the valve 16 is closed. The station then operates with the reserve stored in the buffer tank. As this reserve is reduced, the pressure in the buffer tank drops. Below $7 \times 10^5$ Pa, the installation will start up again (compressor, the two separating lines at the same time, etc.). The user station consumes 100 $Nm^3/h$ of nitrogen with 1% residual oxygen during this cruising operation;

for peak consumption operation of the user station, when the pressure in the buffer tank reaches $6 \times 10^5$ Pa, the line 5 is closed by the programmable controller 14 (shutting off by the pair of valves 8, 9) and the set point of the regulator is changed (again by virtue of the controller), taking account of the oxygen content, making it pass from 1% to 4.5%, resulting in corresponding opening of the regulating valve 15. The user station consumes 165 $Nm^3/h$ of nitrogen with 4.5% residual oxygen during this peak operation, and when the nitrogen consumption of the user station falls down again from the peak flowrate to the nominal flowrate, the same path is followed, but in reverse.

Although this invention has been described with reference to particular embodiments, it is not limited to these, but, on the contrary, is subject to any amendments and variations obvious to the person skilled in the art within the scope of the accompanying claims.

I claim:

1. A process for supplying a flow of nitrogen to a site having flowrate requirements which vary between a nominal flowrate and a range situated above said nominal flowrate comprising the steps of:

a) passing compressed air into a main line in a separating assembly formed by at least two membrane separation lines mounted in parallel, each including a membrane separator having an outlet side and a permeate side, wherein at least one of the separation lines can be shut off from the main line, said separating assembly having one of the following configurations:

a1) when the flowrate requirements are situated at a level of the nominal flowrate, all of the membrane separators of the assembly are in operation, none of the separating lines being shut off;

a2) when the flowrate requirements of the site exceed a predetermined flowrate, at least one of the lines of the separating assembly is shut off, keeping at least one separation line and its membrane separator in operation;

b) advancing nitrogen gas obtained at the outlet side of each of the membrane separators in operation in step a) to a collector itself connected downstream of the main line;

c) evacuating gas obtained at the permeate side of each of the membrane separators in operation in step a), enriched with oxygen, towards the external atmosphere or advancing the gas to a user station requiring use of a gas of this kind enriched with oxygen; and d) directing nitrogen gas delivered by the collector towards at least one user station via a control device for controlling flowrate delivered by the collector, optionally increasing or reducing this flowrate.

2. The process according to claim 1 further comprising the step of initiating a phase a3) in which the line or lines shut off in step a2) are brought back into operation when the flowrate requirements of the site fall back below the predetermined flowrate of step a2).

3. The process according to claim 2 further comprising regulating said flowrate by subdividing a downstream part of the main line downstream of the control device of step d) into at least two secondary lines, wherein each of these lines can be shut off separately and is provided with a flowrate regulator compatible with a predetermined flowrate range, each of these regulators having a downstream part which is connected downstream once again to the downstream part of the main line and, depending on whether a1), a2) or a3) prevails, passing gas originating from said control device via at least one of the at least two secondary lines.

4. The process according to claim 1 further comprising the step of regulating said flowrate during step d).

5. The process according to claim 1 further comprising measuring the flowrate delivered by the collector and/or residual oxygen concentration in the gas delivered by the collector and/or pressure of the gas originating from the collector during step d) and regulating said flowrate using one of said measurements as an input variable.

6. The process according to claim 1 wherein membranes of different types and/or performance are used in said separating assembly and wherein, in the case of a2) of step a), said membrane separator or separators which are shut off are least efficient of the membrane separators of the separating assembly.

7. The process according to claim 1 wherein the nitrogen delivered by the collector has a residual oxygen concentration between about 0.1% and 10%.

8. A process for supplying a flow of nitrogen to a site having flowrate requirements which vary between a nominal flowrate and a range situated above said nominal flowrate comprising the steps of:

a) passing compressed air into a main line in a separating assembly formed by at least two membrane separation lines mounted in parallel, each including a membrane separator having an outlet side and a permeate side, wherein at least one of the separation lines can be shut off from the main line, said separating assembly having one of the following configurations:

a1) when the flowrate requirements are situated at a level of the nominal flowrate, all of the membrane separators of the assembly are in operation, none of the separating lines being shut off;

a2) when the flowrate requirements of the site exceed a predetermined flowrate, at least one of the lines of the separating assembly is shut off, keeping at least one separation line and its membrane separator in operation;

b) advancing nitrogen gas obtained at the outlet side of each of the membrane separators in operation in step a) to a collector itself connected downstream of the main line;

c) evacuating oxygen-enriched gas obtained at the permeate side of each of the membrane separators in operation in step a); and d) directing nitrogen gas delivered by the collector towards at least one user station via a control device for controlling flowrate delivered by the collector, optionally increasing or reducing this flowrate.

9. An installation suitable for supplying a flow of nitrogen to a site having flowrate requirements which vary between a nominal flowrate and a range situated above said nominal flowrate, comprising, along a main line, between an air compressor and at least one user station:

(i) a separating assembly formed by at least two membrane separation lines mounted in parallel, each line including a membrane separator having a permeate side and an outlet side, at least one of the separating lines including means for shutting it off, and each membrane separator being provided with a line for the evacuation of its permeate towards the exterior and with a line for the evacuation of its outlet;

(ii) a collector situated between the separating assembly and a downstream part of the main line, and to which all of the lines for the evacuation of the outlet from the membrane separators of the separating assembly are connected; and (iii) a device for controlling flowrate delivered by the collector, situated between the collector and the user station.

10. The installation according to claim 9 further comprising at least one air-conditioning station interposed between the air compressor and the membrane separation assembly.

11. The installation according to claim 9 further comprising a buffer tank downstream of the device for controlling the flowrate.

12. The installation according to claim 9 further comprising a means for triggering either shutting off or reopening of one or more of the lines of the separating assembly.

13. The installation according to claim 9 wherein the device for controlling the flowrate comprises:

(i) at least one means for varying throughput delivered by the collector; and, optionally, (ii) a means for measuring flowrate and/or residual oxygen concentration in a gas originating from the collector and/or the pressure of the gas originating from the collector; and (iii) a means for regulating said flowrate.

14. The installation according to claim 9 wherein the downstream part of the main line is subdivided downstream of the device for controlling the flowrate into at least two secondary lines, shut-off means allowing each of these lines to be shut off separately, and a flowrate regulator compatible with a predetermined flowrate range on each of the at least two secondary lines, the downstream pan of each of these regulators being connected once again to the main line upstream of the user station.

15. The installation according to claim 9 wherein the separating assembly includes membranes of different types and/or performance.

16. The installation according to claim 9 wherein at least one of the membrane separators of the separating assembly is formed of polyimide or polyaramide membranes.

* * * * *